United States Patent [19]

Tateishi

[11] Patent Number: 5,086,421
[45] Date of Patent: Feb. 4, 1992

[54] DISK PLAYING APPARATUS HAVING A COMPENSATION CHARACTERISTIC VARIABLE WITH VELOCITY INFORMATION

[75] Inventor: Kiyoshi Tateishi, Tokyo, Japan

[73] Assignee: Pioneer Electronic Corporation, Tokyo, Japan

[21] Appl. No.: 585,916

[22] Filed: Sep. 21, 1990

[30] Foreign Application Priority Data

Dec. 22, 1989 [JP] Japan .................................. 1-334280

[51] Int. Cl.⁵ .............................................. G11B 7/00
[52] U.S. Cl. ..................................... 369/50; 369/54; 369/59; 369/48; 360/73.01
[58] Field of Search ..................... 369/54, 47, 48, 50, 369/59, 58, 32, 124, 33, 44.27; 360/73.01, 73.05, 73.08, 73.09; 358/342

[56] References Cited

U.S. PATENT DOCUMENTS 4,338,683 7/1982 Furukawa et al. ................... 369/50
4,575,835 3/1986 Nishikawa et al. .................. 369/50
4,623,939 11/1986 Machida et al. ..................... 369/50
4,908,810 3/1990 Oie ........................................ 369/50

Primary Examiner—Roy N. Envall, Jr.
Assistant Examiner—Thang V. Tran
Attorney, Agent, or Firm—Wegner, Cantor, Mueller & Player

[57] ABSTRACT

A disk playing apparatus having a compensating circuit for compensating phase and frequency characteristics of a read signal from a disk, wherein a compensation characteristic of the compensating circuit is varied according to a linear velocity. The disk playing apparatus includes means for reading information from the disk and means for outputting velocity information indicative of a reading speed from the disk by the reading means. The compensation characteristic is varied according to the velocity information. Accordingly, in the case of a CLV disk, a flat group delay characteristic is always obtained irrespective of changes in the linear velocity.

3 Claims, 3 Drawing Sheets

DISK PLAYING APPARATUS HAVING A COMPENSATION CHARACTERISTIC VARIABLE WITH VELOCITY INFORMATION

BACKGROUND OF THE INVENTION

1. Field of the Invention

The present invention relates to a disk playing apparatus, and more particularly to a disk playing apparatus for playing a disk on which a digital signal treated by a predetermined modulation process is recorded.

2. Description of Background Information

Information recording systems using a disk-like recording medium are generally classified into CAV (constant angular velocity) and CLV (constant linear velocity) systems. A disk of the CLV system which will be hereinafter referred simply to as the CLV disk has an advantage such that it can record about two times as much information as with a disk of the CAV recording system. Therefore, the CLV recording system is adopted for the digital audio disk called CD (compact disk) and the CD-ROM used as a digital data recording medium, having the same basic recording format.

With such recording disks, a surface recording density can be improved by raising a linear recording density. However, when the linear recording density is improved an interference to the reproduced signal is generated by precedent and subsequent recorded patterns, causing a phase shift, which is called a pattern peak shift phenomenon. In order to reduce the amount of such a pattern peak shift, RLL (Run Length Limited) modulation code format is used in recording digital signal on an optical disk as typically in the recording of the CD.

However, even by using the RLL modulation code format, it is impossible to eliminate the pattern peak shift completely. Accordingly, in a disk playing apparatus, an RF compensating circuit for a read RF (high frequency) signal from the disk is provided so that phase and frequency characteristics of the RF signal are compensated by the RF compensating circuit thereby making a group delay characteristic flat and preventing an increase in data detection error rate. FIG. 1 shows a compensation characteristic of such an RF compensating circuit. As shown in FIG. 1, the RF signal is emphasized by 6 through 10 dB for 3T with respect to 11T, where T denotes a bit period of the pulse train signal. As shown in FIG. 2, a waveform after compensation (dashed line) by the RF compensating circuit can be obtained in comparison with a waveform before the compensation (solid line).

Meanwhile, techniques for the high-speed access of the CD-ROM have been advanced in recent years, in order to satisfy a need of quickly reading desired data from a CD-ROM. However, even if the speed of access is merely increased, still a relatively long time is required for reading a large amount of data such as image information data. Further, there is a limit in reducing a total period of time required for reading the data. Thus, it is necessary to increase a reading speed of recorded information from the CD-ROM. Such a requirement can be met by raising the linear velocity to a value higher than a normal linear velocity, e.g., a value twice or four times the normal linear velocity in reading recorded information.

However, in reading the recorded information at a linear velocity twice or four times the normal linear velocity for example, to increase the reading speed of the data from the CD-ROM, a flat group delay characteristic cannot be obtained unless the RF compensation for the RF signal read from the disk is carried out depending of the higher linear velocity. The variation in the group delay characteristic in turn causes an increase in the data detection error rate.

OBJECT AND SUMMARY OF THE INVENTION

It is accordingly an object of the present invention to provide a disk playing apparatus which can carry out the RF compensation of the read RF signal from the disk depending on the speed of reading the recorded information.

According to the present invention, there is provided a disk playing apparatus for playing a disk on which a digital signal treated by a predetermined modulation process is recorded, comprising reading means for reading information recorded on said disk; velocity information outputting means for outputting velocity information indicating the speed of reading information from said disk by said reading means; and compensating means for compensating phase and frequency characteristics of a read signal obtained by said reading means, said compensating means having a compensation characteristic variable with said velocity information.

In the disk playing apparatus according to the present invention a read signal from a disk, on which a digital signal treated by a predetermined modulation process is recorded, is compensated in phase and frequency characteristics, and the compensation characteristic is varied according to the speed o reading the recorded information from the disk.

DETAILED DESCRIPTION OF A PREFERRED EMBODIMENT

A preferred embodiment of the present invention will now be described with reference to the drawings.

Figure 1:
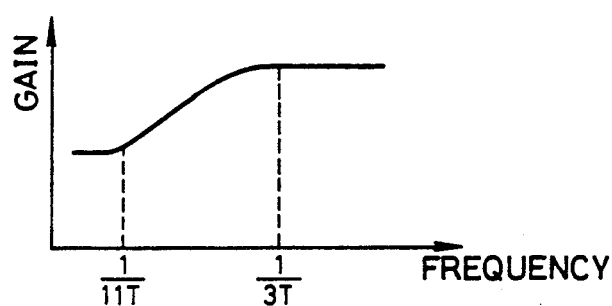
FIG. 1 is a graph showing a compensation characteristic of an RF compensating circuit.
Figure 2:
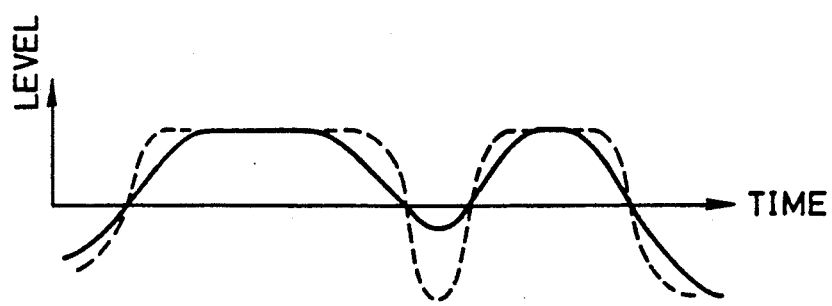
FIG. 2 is a graph showing waveforms before the compensation (solid line) and after the compensation (dashed line) by the RF compensating circuit.
Figure 3:
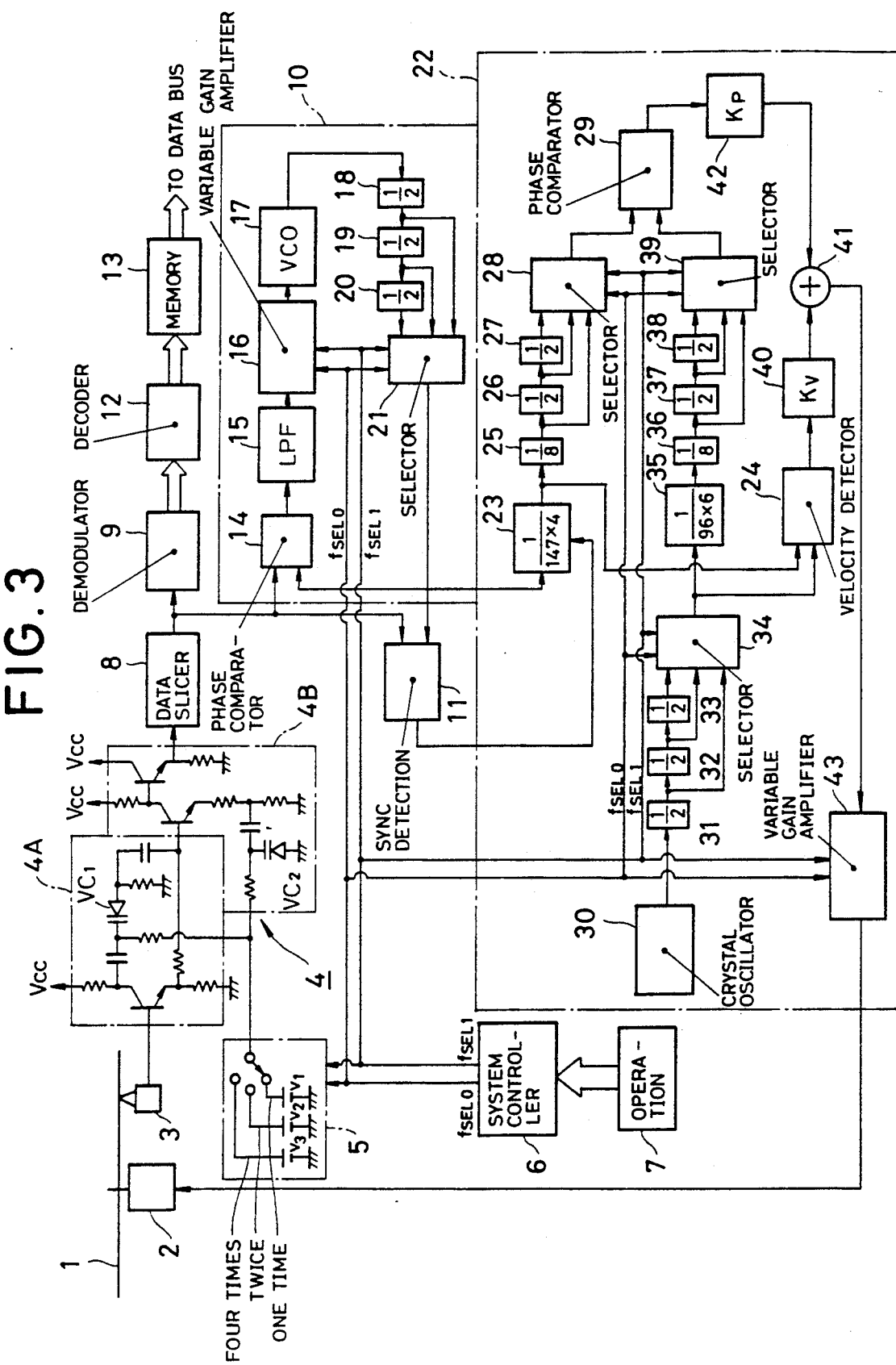
FIG. 3 is a block diagram partly including circuit diagrams showing a preferred embodiment of the disk playing apparatus according to the present invention.
Figure 4:
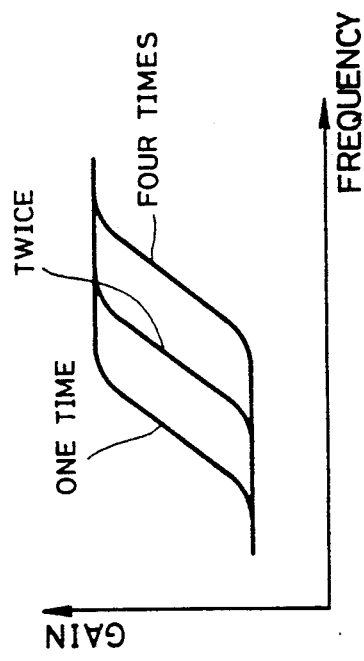
FIG. 4 is a graph showing a compensation characteristic of the RF compensating circuit shown in FIG. 3 corresponding to the linear velocity.

FIG. 3 is a block diagram partly including circuit diagrams showing a preferred embodiment of the resent invention. In FIG. 3, the reference numeral 1 designates a disk on which digital information data is recorded b an EFM (Eight to Fourteen Modulation) system, for example. The disk 1 is rotationally driven by a spindle motor 2, and the recorded information on the disk 1 is read by an optical pickup 3. The optical pickup 3 is carried by a slider (not shown) provided movably in a radial direction of the disk 1. A read RF signal t be output from the pickup 3 is supplied to an RF compensating circuit 4. The RF compensating circuit 4 is made up of a phase shift circuit 4A for compensating a phase characteristic of a read RF signal by correcting a phase shift of the RF signal caused by the pattern peak shift phenomenon as mentioned above and a high frequency emphasizing circuit 4B for compensating a frequency characteristic of the read RF signal by correcting attenuation of a high frequency component of the RF signal caused by an aperture effect of an information reading optical spot of the pickup 3. Both the circuits 4A and 4B have variable characteristics of compensation. That is, the phase shift circuit 4A and the high frequency emphasizing circuit 4B include varactor diodes $VC_1$ and $VC_2$, respectively, to which control voltages $v_1$ through $v_3$ ($v_1 < v_2 < v_3$) are applied as a bias voltage, and the compensation characteristics of both the circuits 4A and 4B are varied according to the control voltages in a manner as shown in FIG. 4. One of the control voltages $v_1$ through $v_3$ for varying the compensation characteristic is selectively output from a control voltage generating circuit 5 according to the content of control codes $f_{SEL0}$ and $f_{SEL1}$ issued from a system controller 6.

The system controller 6 is constructed of a microcomputer for example, and when one of three linear velocities for reading information, i.e., one of a reference linear velocity (one time), a higher linear velocity (twice the reference linear velocity) and a further higher linear velocity (four times the reference linear velocity), for example, is designated in an operating section 7, the system controller 6 outputs the control codes $f_{SEL0}$ and $f_{SEL1}$ according to the designated linear velocity. The content of the control codes $f_{SEL0}$ and $f_{SEL1}$ is defined as shown in Table below, for example.

TABLE

| Linear Velocity | Four Times | Twice | One Time |
|---|---|---|---|
| $f_{SEL0}$ | 0 | 1 | 0 |
| $f_{SEL1}$ | 0 | 0 | 1 |

The RF signal compensated in phase and frequency characteristics in the RF compensating circuit 4 is waveform-shaped in a data slice circuit 8 so as to be converted into a rectangular pulse. Then, it is fed to a demodulating circuit 9, a clock regenerating PLL circuit 10 and a synchronization detecting circuit 11. The demodulating circuit 9 performs the demodulation of the EFM signal of the rectangular pulse and the detection and correction of error to demodulate the data. The demodulated data is decoded in a decoder 12 and converted into image data and various control data. These data are once written in a buffer memory 13, and then transferred to a data bus (not shown) at high speed.

The clock reproducing PLL circuit 10 extracts a clock component in a sequence of the EFM signal, and generates a pulse signal of a predetermined frequency synchronized with the extracted clock component, to provide a reproduced clock. That is, a phase comparator 14 is provided for comparing the phase of the EFM signal of rectangular pulses with the phase of the reproduced clock. A low frequency component of a phase difference signal as a comparison output from the phase comparator 14 passes an LPF (low pass filter) 15, and is then amplified by a variable gain amplifier 18, to provide a control voltage for a VCO (voltage control oscillator) 17. The variable gain amplifier 18 varies its gain to values of +12 dB, +6 dB and 0 dB corresponding to the one-time, twice, and four-times linear velocities according to the content of the control codes $f_{SEL0}$ and $f_{SEL1}$ supplied from the system controller 6. The VCO 17 generates a clock of 34.5744 MHz. This clock is divided in frequency to ⅛ by three ½ frequency dividers 18 through 20 connected in series, and is then fed to a first input port of a three-input selector 21. Further, this clock is divided in frequency to ¼ by the ½ frequency dividers 18 and 19, and is then input into a second input port of the selector 21. Further, this clock is divided in frequency to ½ by the ½ frequency divider 18, and is then fed into a third input port of the selector 21. The selector 21 outputs the ⅛, ¼ and ½ divided clocks as the reproduced clock corresponding to the one-time, twice and four-times linear velocities according to the content of the control codes $f_{SEL0}$ and $f_{SEL1}$ supplied from the system controller 6. This reproduced clock is supplied to the synchronization detecting circuit 11 and a CLV servo circuit 22.

The synchronization detecting circuit 11 receives the reproduced clock to extract a synchronizing signal inserted during the recording from the EFM signal of the rectangular pulses, and outputs the extracted synchronous signal as a reproduced sync signal.

In the CLV servo circuit 22, the reproduced clock from the PLL circuit 10 is divided in frequency to 1/(147×4) by a frequency divider 23 reset by the reproduced synchronous signal from the synchronization detecting circuit 11.

This frequency divided clock becomes a pulse signal having a duty ratio of 50% which is synchronized with the reproduced synchronizing signal, and this pulse signal is used as a writing clock for the memory 13. The writing clock is fed to a first input port of a velocity detector 24, while it is divided in frequency to an ⅛ of the original signal by an ⅛ frequency divider 25, and is then fed to a first input port of a three-input selector 28. Further, the writing clock is divided in frequency to a 1/16 of the original signal by the ⅛ frequency divider 25 and a ½ frequency divider 26, and is then fed to a second input port of the selector 28. Further, the writing clock is divided in frequency to a 1/32 of the original signal by the ⅛ frequency divider 25, the ½ frequency divider 26 and a ½ frequency divider 27, and is then fed to a third input port of the selector 28. The selector 28 selectively transmits the ⅛, 1/16 and 1/32 divided clocks corresponding to the one-time, twice and four-times linear velocities according to the content of the control codes $f_{SEL0}$ and $f_{SEL1}$ supplied from the system controller 6. This selected clock is fed to a first input port of a phase comparator 29.

On the other hand, a crystal oscillator 30 generates a clock of 33.8688 MHz as a reference synchronizing signal. This reference clock is divided in frequency to an ⅛ of the original signal by three ½ frequency dividers 31 through 33 connected in series with each other, and is then fed to a first input port of a three-input selector 34. Further, the reference clock is divided in frequency to a ¼ of the original signal by the ½ frequency dividers 31 and 32, and is then fed to a second input port of the selector 34. Further, the reference clock is divided in frequency to a ½ of the original signal by the ½ frequency divider 31, and is then fed to a third input port of the selector 34. The selector 84 selectively transmits the ⅛, ¼ and ½ divided clocks as a master clock corresponding to the one-time, twice and four-times linear velocities according to the content of the control codes $f_{SEL0}$ and $f_{SEL1}$ supplied from the system controller 6. This master clock is fed to a second input port of the velocity detector 24, while it is divided in frequency to a 1/(96×6) of the original signal by a frequency divider 35, and the frequency divided clock is used as a reading clock for the memory 13. This reading clock is divided in frequency to an ⅛ of the original signal by a ⅛ frequency divider 36, and is then input into a first input port of a three-input selector 39. Further, the reading clock is divided in frequency to a 1/16 of the original signal by the ⅛ frequency divider 36 and a ½ frequency divider 37, and is then fed to a second input port of the selector 39. Further, the reading clock is divided in frequency to a 1/32 of the original signal by the ⅛ frequency divider 36, the ½ frequency divider 37 and a ½ frequency divider 38, and is then fed to a third input port of the selector 39. The selector 39 selectively transmits the ⅛, 1/16 and 1/32 divided clocks corresponding to the one-time, two-times and four-times linear velocities according to the content of the control codes $f_{SEL0}$ and $f_{SEL1}$ supplied from the system controller 6. This selected clock is input into a second input port of the phase comparator 29.

The velocity detector 24 outputs a velocity error signal having a pulse width corresponding to a frequency difference between the master clock and the writing clock. The velocity error signal is multiplied by a coefficient Kv in a coefficient multiplier 40, and is then fed to a first input port of an adder 41. On the other hand, the phase comparator 29 produces a phase error signal having a pulse width corresponding to a phase difference between the output clocks from the selectors 28 and 39, that is, a phase difference between the frequency divided clocks obtained by dividing the writing clock and the master clock in frequency at a frequency division ratio corresponding to the designated linear velocity. The phase error signal is multiplied by a coefficient Kp in a coefficient multiplier 42, and is then fed to a second input port of the adder 41. The adder 41 adds the velocity error signal multiplied by the coefficient Kv to the phase error signal multiplied by the coefficient Kp, and issues the sum of these signals as a spindle error signal. The spindle error signal is supplied through a variable gain amplifier 43 to the spindle motor 2. The variable gain amplifier 43 varies a gain to 0 dB, +6 dB and +12 dB corresponding to the one-time, twice and four-times linear velocities according to the content of the control codes $f_{SEL0}$ and $f_{SEL1}$ supplied from the system controller 6.

Thus, a rotational velocity of the disk 1 is controlled by the above-constructed CLV servo circuit 22 to make the linear velocity constant and the linear velocity becomes equal to the linear velocity designated by the operating section 7.

In operation, when the linear velocity is set to be a value twice or four times the reference linear velocity, to increase a speed of data reading from the CLV disk such as a CD-ROM, the control voltage $v_2$ or $v_8$ corresponding to the set linear velocity is generated from the control voltage generating circuit 5, and it is applied as a bias voltage to the varactor diodes $VC_1$ and $VC_2$ in the RF compensating circuit 4, thereby carrying out the phase compensation and the frequency compensation for the read RF signal from the disk 1 on the basis of the linear velocity. Therefore, it is possible to always obtain a flat group delay characteristic irrespective of a change in the linear velocity and to prevent an increase in the data detection error rate, thereby achieving a high-speed data reading by increasing the linear velocity.

In the above preferred embodiment, all of the frequency dividers 18-20 for dividing the output pulse from the VCO 17, the frequency dividers 25 through 27 for dividing the writing clock, the frequency dividers 31 through 33 for dividing the output clock from the crystal oscillator 30, and the frequency dividers 36 through 38 for dividing the reading clock are connected in series in three stages to obtain the clocks having the frequencies respectively corresponding to the designated linear velocity. However, dividers having frequency division ratios respectively corresponding to the designated linear velocity may be connected in parallel to each selector. In this case, it is possible to similarly obtain the clocks having the frequencies respectively corresponding to the designated linear velocity.

Further, although the above preferred embodiment has been explained in the case where the CLV disk is rotationally driven at a constant linear velocity, the present invention may be applied to the case where the CLV disk is rotationally driven at a constant angular velocity. In this case, the linear velocity varies with a change in position of the information reading optical spot of the pickup 3 in the radial position of the disk. Accordingly, the phase compensation and the frequency compensation for the read RF signal from the disk 1 may be continuously carried out according to a change in the linear velocity by generating a control voltage which continuously varies in level with the change in the disk radial position of the information reading optical spot, and applying this control voltage as a bias voltage to the varactor diodes $VC_1$ and $VC_2$ in the RF compensating circuit 4.

Figure 5:
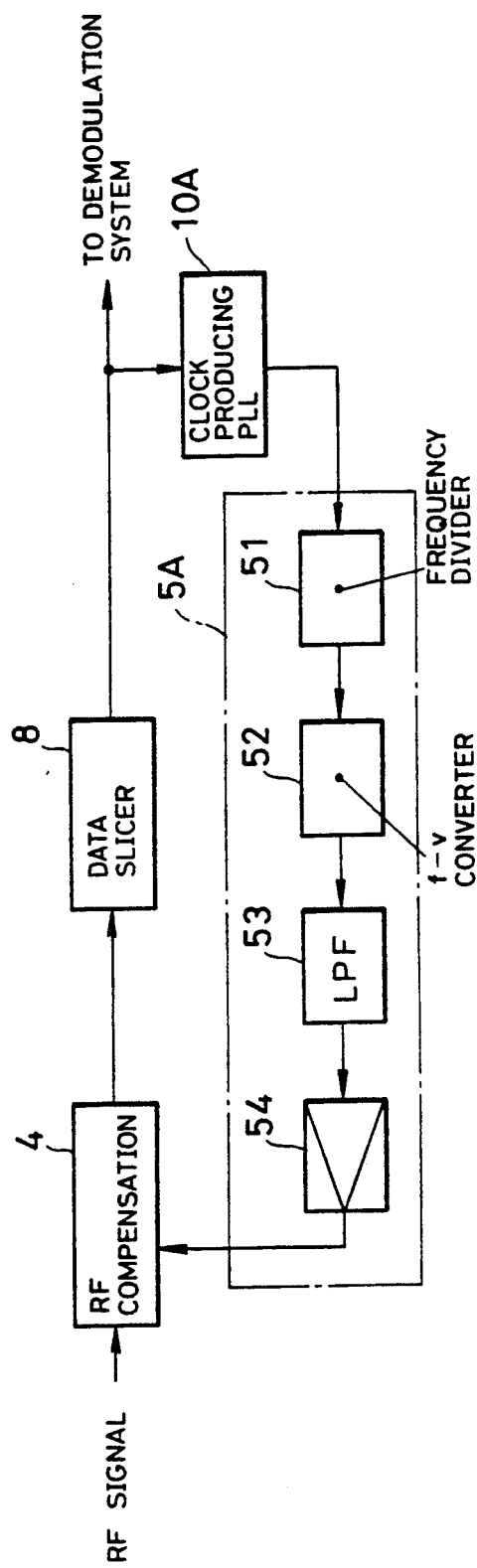
FIG. 5 is a block diagram showing the case where the CLV disk is rotationally driven at a constant angular velocity.

FIG. 5 shows an example of the control voltage generating circuit 5A for generating such a control voltage which continuously varies in level with the change in the disk radial position of the information reading optical spot. The control voltage generating circuit 5A is constructed of a frequency divider 51 for dividing, at a predetermined frequency division ratio, a reproduced clock having a predetermined frequency to be supplied from a clock regenerating PLL circuit 10A, a f-V converter 52 for converting a frequency of the divided clock to a voltage, an LPF 53 for passing a low frequency component of the converted voltage, and an amplifier 54 for amplifying the low frequency component having passed the LPF 53 and issuing the amplified component as a control voltage. With the above-constructed control voltage generating circuit 5A, it is possible to generate a control voltage having a level to be continuously varied with a change in disk radial position of the information reading optical spot on the basis of the reproduced clock extracted from the read RF signal.

The clock regenerating PLL circuit 10A has the same construction as that of the PLL circuit 10 shown in FIG. 3 except that the gain of the amplifier 16 is fixed, and the output clock from the VCO 17 is used as it is for the reproduced clock. Further, a disk playing apparatus for rotationally driving the CLV disk at a constant angular velocity has already been proposed in a patent application filed by the present assignee as Japanese Patent Application No. 1-199884.

As described above, in the disk playing apparatus according to the present invention, a read signal from a disk on which a digital signal treated by a predetermined modulation process is recorded is compensated in phase and frequency characteristics, and the compensation characteristic is varied according to the speed of reading the recorded information from the disk. As a result, a flat group delay characteristic may be always obtained irrespective of a change in linear velocity, and an increase in data detection error rate can be prevented, with the result that a high-speed data reading by increasing the linear velocity is achieved.

What is claimed is:

1. A disk playing apparatus for playing a disk on which a digital signal treated by a predetermined modulation process is recorded, comprising:

reading means for reading information recorded on said disk;

velocity information outputting means for outputting velocity information indicating the speed of reading information from said disk by said reading means; and compensating means for compensating phase and frequency characteristics of a read signal obtained by said reading means, said compensating means having a compensation characteristic variable with said velocity information.

2. The disk playing apparatus as defined in claim 1 further comprising designating means for designating a predetermined linear velocity, wherein said velocity information outputting means outputs said velocity information corresponding to said linear velocity designated by said designating means.

3. The disk playing apparatus as defined in claim 1 further comprising means for generating a reproduced clock synchronized with a clock component included in said read signal by said reading means, wherein said velocity information outputting means outputs said velocity information corresponding to a frequency of said reproduced clock.

* * * * *